H. H. WESTINGHOUSE.
AIR COMPRESSOR.
APPLICATION FILED NOV. 3, 1913.
1,196,055.
Patented Aug. 29, 1916.
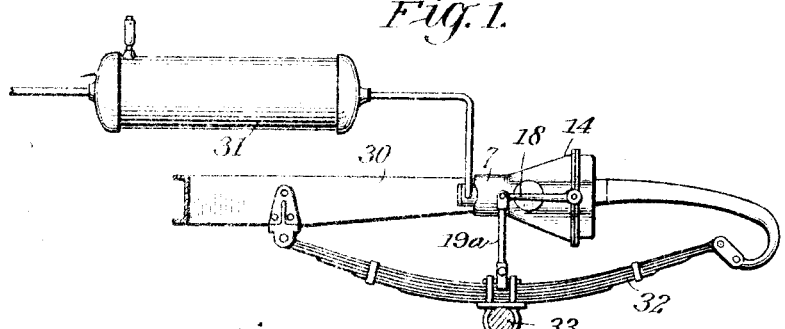
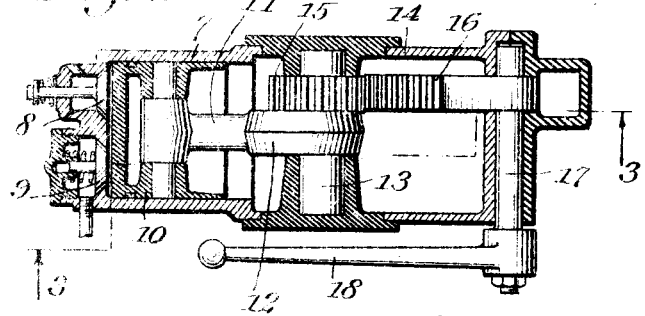
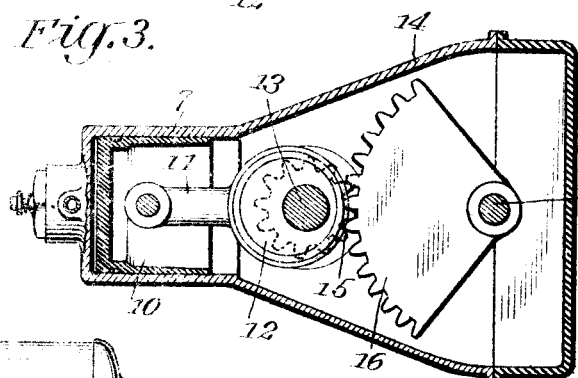
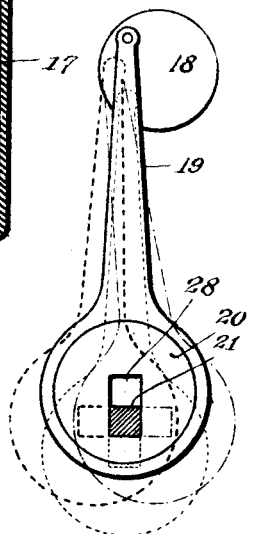
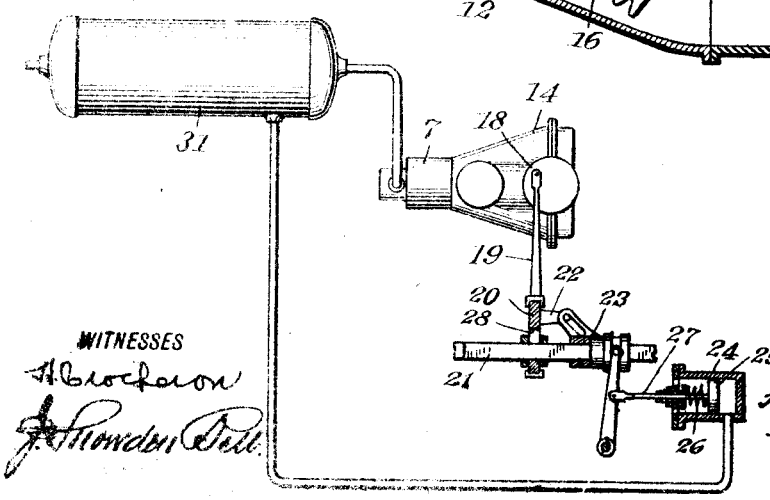
WITNESSES
INVENTOR
H. H. Westinghouse
BY
Edmund Wright
ATTORNEY

UNITED STATES PATENT OFFICE.

HENRY HERMAN WESTINGHOUSE, OF NEW YORK, N. Y.

AIR-COMPRESSOR.

1,196,055.

Specification of Letters Patent.   Patented Aug. 29, 1916.

Application filed November 3, 1913.   Serial No. 798,861.

*To all whom it may concern:*

Be it known that I, HENRY HERMAN WESTINGHOUSE, a citizen of the United States, residing at the borough of Manhattan, in the city, county, and State of New York, have invented a certain new and useful Improvement in Air-Compressors, of which improvement the following is a specification.

This invention relates to air compressors and driving mechanism for the same, one of the objects being to provide an improved driving mechanism having a reciprocating, oscillating, or other to-and-fro movement upon both sides of an intermediate or central position, in which the pump piston is at the extreme inner end of its stroke, whereby the movement of the mechanism in either direction from said position causes the pump piston to make an outward stroke, and the return movement of the mechanism forces the piston back to its inner position.

Another object is to govern the pressure produced by a continuously operated pump of this character by varying the length of the stroke of the pump piston outward from said extreme inner position; and still another object is to utilize the vertical vibrations of a vehicle for actuating the reciprocating or oscillating driving mechanism for the compressor, whereby the same also serves as a shock absorber for the vehicle.

In the accompanying drawings: Figure 1 is a diagrammatic elevation illustrating my improvement applied to a motor vehicle; Fig. 2, a horizontal section of an air compressor embodying my improvement; Fig. 3, a vertical section taken substantially on the line 3—3 of Fig. 2; Fig. 4, a diagrammatic view showing a continuously operating eccentric for the driving mechanism, and a governing device controlled by the pump pressure for shifting the eccentric to vary the length of the stroke of the pump piston, some of the parts being shown in section; and, Fig. 5, a transverse view, different portions of the eccentric being indicated in dotted lines.

According to the construction shown, the air compressor comprises the cylinder, 7, having the suction and discharge valves, 8 and 9, mounted in the cylinder head, and preferably substantially flush with the inner face thereof so as to practically eliminate all clearance space, piston, 10, rod, 11, and crank or eccentric, 12, mounted on shaft, 13, having bearings in the walls of the crank casing, 14. Any suitable driving mechanism having a reciprocating or oscillating movement to and fro may be employed, that shown comprising a pinion gear, 15, mounted on the crank shaft, and meshing with the segment gear, 16, having a shaft, 17, and actuating disk or arm, 18, which may be oscillated by any desired means. The driving mechanism thus has a movement in opposite directions, upon both sides of an intermediate or central position in which the pump piston is at the extreme inner end of its stroke, as shown in the drawing, whereby the movement in either direction causes the pump piston to move outward a longer or shorter distance and then back to its inner position. As the actuating arm, 18, is oscillated, it moves the segmental gear, 16, and causes the pinion, 15, and shaft, 12, to turn alternately in opposite directions, thereby reciprocating the pump piston.

For the purpose of oscillating the disk or arm, 18, an eccentric, 20, connected by rod, 19, to said arm, and mounted on a continuously running shaft, 21, may be employed. In order to govern the pump according to the pressure, the eccentric, 20, may be provided with a slot, 28, and have a shifting means, such as coacting cam or wedge members, 22 and 23, the latter being adjustable longitudinally of the shaft by a fluid pressure device, such as cylinder, 24, piston, 25, stem, 27, and adjustable spring, 26.

With such a construction it will be seen that when the pressure is low, the eccentric, 20, occupies a position with the shaft at the outer end of the slot, whereby the throw of the eccentric is maximum, and the pump piston makes its longest stroke. As the pump pressure is increased, the eccentric is shifted to bring its center toward the center of the driving shaft, thereby reducing the eccentricity and also the length of stroke of the pump piston. In this way the length of stroke of the driving mechanism and the pump piston is automatically varied according to the degree of pressure produced by the pump when the same is operating continuously and the pressure is thus controlled. It will be noticed that in governing the pump by varying the length of stroke of the piston in this manner, the stroke is changed at its outer end only, the piston always returning to its extreme inner position almost in contact with the face of the cylinder head, whereby there is substantially no clearance and all of the air displaced by the piston will be forced into the reservoir regardless of the length of stroke. This is an important feature as it greatly increases the efficiency of the pump.

In Fig. 1, I have shown the air compressor mounted on the frame, 30, of a motor vehicle, over the spring, 32, with the reciprocating bar, 19ª, attached to the axle, 33, for oscillating the arm, 18, by the vertical vibratory movements of the body of the vehicle upon its springs. In the normal position of the vehicle springs, the arm, 18, of the driving mechanism occupies its intermediate position with the pump piston at the inner end of its stroke so that any vertical vibration of the vehicle body causes the driving mechanism to actuate the piston as before described, and compress air into the reservoir, 31. It also serves as a shock absorber for the vehicle.

As shown in the diagrammatic view, Fig. 4, the pump appears in side elevation, while the driving eccentric and pressure governing means are indicated in longitudinal section for the purpose of showing the position of the eccentric relative to the crank disk, 18, of the pump, it being understood, however, that in practice, the eccentric, 20, and crank disk, 18, are usually in parallel planes, as indicated in Fig. 5. With the movement of the eccentric to its highest position, as shown in Figs. 4 and 5, the segment gear, 16, is turned to its extreme upper position with the piston at the outer end of its stroke, and as the eccentric rotates through the different positions, as indicated in dotted lines in Fig. 5, the crank disk, 18, is oscillated, and produces the reciprocating movement of the piston in the cylinder, thereby compressing air into the reservoir, 31.

It will now be seen that I have provided a compressor having a variable stroke governed by the fluid pressure, but having a constant minimum clearance whereby the efficiency is greatly increased.

Having now described my invention, what I claim as new and desire to secure by Letters Patent is:

1. In an air compressor, the combination with a cylinder, piston and crank shaft, of a reciprocating driving mechanism having an intermediate position with the piston at the inner end of its stroke, and a movement upon both sides of said intermediate position for turning said shaft alternately in opposite directions.

2. In an air compressor, the combination with a cylinder and piston, of a segmental gear having a driving connection with said piston, the gear being at an intermediate position when the piston is at the inner end of its stroke, and means for oscillating said gear alternately in opposite directions.

3. In an air compressor, the combination with a cylinder, piston, and crank shaft having a pinion, of a driving gear meshing with said pinion and having an intermediate position with the piston at the inner end of its stroke, and reciprocating means for actuating said gear to turn the pinion alternately in opposite directions.

4. In an air compressor, the combination with a cylinder, piston and crank shaft, of a reciprocating driving mechanism having an intermediate position with the piston at the inner end of its stroke, and a movement upon both sides of said intermediate position for turning said shaft alternately in opposite directions, and means for varying the length of the stroke of the driving mechanism.

5. In an air compressor, the combination with a cylinder, piston and crank shaft, of a reciprocating driving mechanism having an intermediate position with the piston at the inner end of its stroke, and a movement upon both sides of said intermediate position for turning said shaft alternately in opposite directions, and means governed by the pump pressure for varying the length of stroke of the driving mechanism.

6. In an air compressor, the combination with a cylinder, piston and crank shaft, of a reciprocating driving mechanism having an intermediate position with the piston at the inner end of its stroke, and a movement upon both sides of said intermediate position for turning said shaft alternately in opposite directions, said mechanism including a continuously rotating eccentric, and means for shifting said eccentric to vary the length of its stroke.

7. In an air compressor, the combination with a cylinder, piston and crank shaft, of a reciprocating driving mechanism having an intermediate position with the piston at the inner end of its stroke, and a movement upon both sides of said intermediate position for turning said shaft alternately in opposite directions, said mechanism including a continuously rotating eccentric, and means governed by the pump pressure for shifting said eccentric to vary the length of its stroke.

In testimony whereof I have hereunto set my hand.

HENRY HERMAN WESTINGHOUSE.

Witnesses:
J. SNOWDEN BELL,
EDWARD A. WRIGHT.